(12) United States Patent
Jones

(10) Patent No.: US 8,896,662 B2
(45) Date of Patent: *Nov. 25, 2014

(54) METHOD OF CREATING A VIRTUAL WINDOW

(75) Inventor: Peter W. J. Jones, Belmont, MA (US)

(73) Assignee: Scallop Imaging, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,388

(22) Filed: Sep. 14, 2012

(65) Prior Publication Data

US 2013/0215217 A1 Aug. 22, 2013

Related U.S. Application Data

(63) Continuation of application No. 11/891,928, filed on Aug. 13, 2007, now Pat. No. 8,269,818, which is a continuation of application No. 10/350,900, filed on Jan. 23, 2003, now Pat. No. 7,262,789.

(60) Provisional application No. 60/351,083, filed on Jan. 23, 2002.

(51) Int. Cl.
| | |
|---|---|
| *H04N 7/00* | (2011.01) |
| *H04N 17/00* | (2006.01) |
| *F41H 11/00* | (2006.01) |
| *F41H 13/00* | (2006.01) |
| *G06F 1/16* | (2006.01) |
| *H04N 5/232* | (2006.01) |
| *H04N 5/262* | (2006.01) |

(52) U.S. Cl.
CPC ............. *H04N 17/004* (2013.01); *F41H 11/00* (2013.01); *F41H 13/00* (2013.01); *G06F 1/1601* (2013.01); *H04N 5/23238* (2013.01); *H04N 5/2628* (2013.01); *H04N 17/002* (2013.01)
USPC ................... 348/36; 348/39; 348/38; 348/48; 348/43; 382/194; 382/199; 382/154

(58) Field of Classification Search
USPC ............ 348/36, 39, 38, 48, 43; 382/194, 199, 382/154
See application file for complete search history.

(56) References Cited

U.S. PATENT DOCUMENTS

| | | | | | |
|---|---|---|---|---|---|
| 5,416,392 | A | * | 5/1995 | Lee et al. .................... | 318/568.1 |
| 5,657,073 | A | * | 8/1997 | Henley ............................ | 348/38 |
| 6,466,701 | B1 | * | 10/2002 | Ejiri et al. ..................... | 382/284 |
| 6,781,618 | B2 | * | 8/2004 | Beardsley ........................ | 348/43 |
| 7,262,789 | B2 | * | 8/2007 | Jones .............................. | 348/36 |
| 8,269,818 | B2 | * | 9/2012 | Jones .............................. | 348/36 |

* cited by examiner

*Primary Examiner* — Shawn An
(74) *Attorney, Agent, or Firm* — Schmeiser, Olsen & Watts LLP

(57) ABSTRACT

The systems and methods described herein include, among other things, a technique for calibrating the outputs of multiple sensors, such as CCD devices, that have overlapping fields of view and mapping the pixels of those outputs to the pixels of a display screen by means of a lookup table so that a user can see a selected field of view within the larger fields of view that are seen by the sensors.

5 Claims, 18 Drawing Sheets section

METHOD OF CREATING A VIRTUAL WINDOW

CROSS REFERENCE TO RELATED APPLICATIONS

This application is a continuation of U.S. patent application Ser. No. 11/891,928, filed Aug. 13, 2007, now U.S. Pat. No. 8,269,818 which is a continuation of U.S. patent application Ser. No. 10/350,900, filed Jan. 23, 2003, now U.S. Pat. No. 7,262,789, which claims the benefit of earlier filed U.S. provisional patent application Ser. No. 60/351,083, filed on Jan. 23, 2002, the contents of all of which are herein incorporated by reference.

BACKGROUND

Today, there are inexpensive sensors that can collect data, including image data, and store that data in a computer readable format. One example of such a sensor is the CCD image sensor. Software programs can then access the stored data and manipulate and process the data to extract useful information.

The low cost of these sensors and the ready availability of computer programs to process data generated from these sensors has led to a host of new applications and devices, including inexpensive video cameras suited to videophone and image capture applications.

One disadvantage of these low cost devices has been the limited field-of-view they cover. Given their low cost, engineers have attempted to use multiple sensors to increase the field of view. However, as each sensor captures a separate field of view, any system that employs multiple sensors, must also have a system that integrates the different fields-of-view together to create one image or one set of data. Unfortunately, integrating multiple fields-of-view into a single composite data set is not a trivial exercise. The software to identify gaps and overlaps can be quite complex and expensive. Systems that precisely align the sensors to reduce overlap or gaps are costly to manufacture and thus defeat the purpose of using the low cost sensors.

Additionally, other prior art systems include very wide angle lens which are corrected by image processing operations. In this way a panoramic view may be created. However, such systems are costly and the efficacy of the image correction can vary depending upon the field of depth of the image.

Thus, there is a need for an efficient and inexpensive system that can allow multiple sensors to work together to provide a composite image presenting an enlarged field-of-view.

SUMMARY OF THE INVENTION

The systems and methods described herein include, among other things, a technique for calibrating the outputs of multiple sensors, such as CCD devices, that have overlapping fields of view and mapping the pixels of those outputs to the pixels of a display screen by means of a lookup table so that a user can see a selected field of view within the larger fields of view that are seen by the sensors.

BRIEF DESCRIPTION OF THE DRAWINGS

The foregoing and other objects and advantages of the invention will be appreciated more fully from the following further description thereof, with reference to the accompanying drawings wherein.

DESCRIPTION

Figure 1:
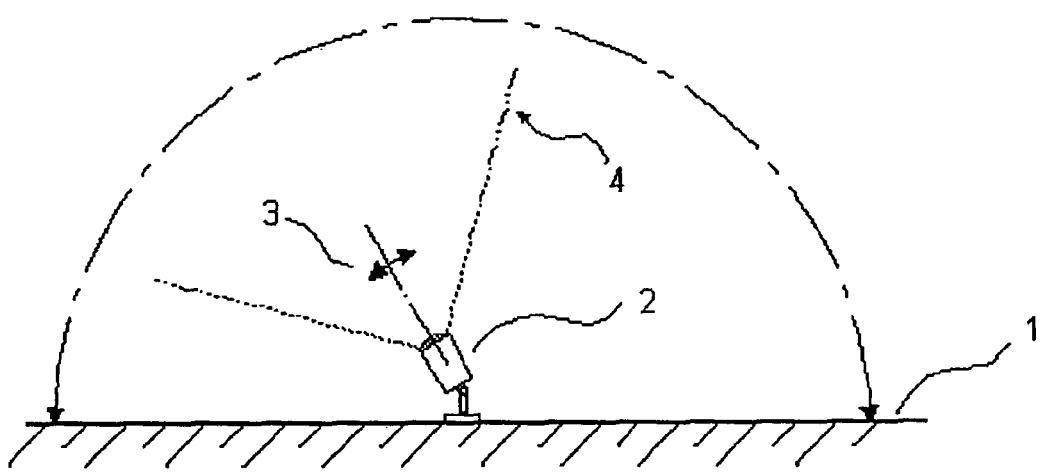
FIGS. 1 and 2 depict a prior art system for providing a panoramic view.
Figure 2:
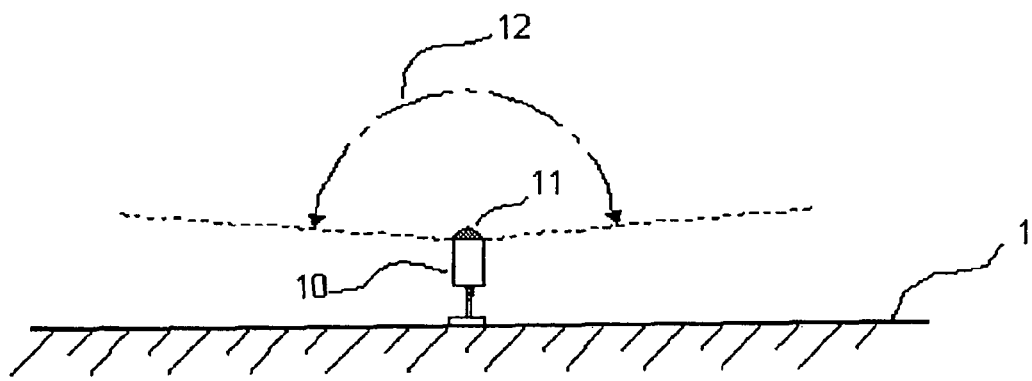
Figure 4:
FIG. 4 depicts a graphic scene.

Panoramic views are quite useful and there are numerous existing systems for generating such views. FIGS. 1 and 2 depict a prior art system for providing such a panoramic view. Particularly, FIG. 1 depicts that a sensor 2 capable of collecting an image may be mounted on to a mechanical pivot and moved through an arc 3, 4 to generate a panoramic view of a scene, such as the scene depicted in FIG. 4.

Figure 3:
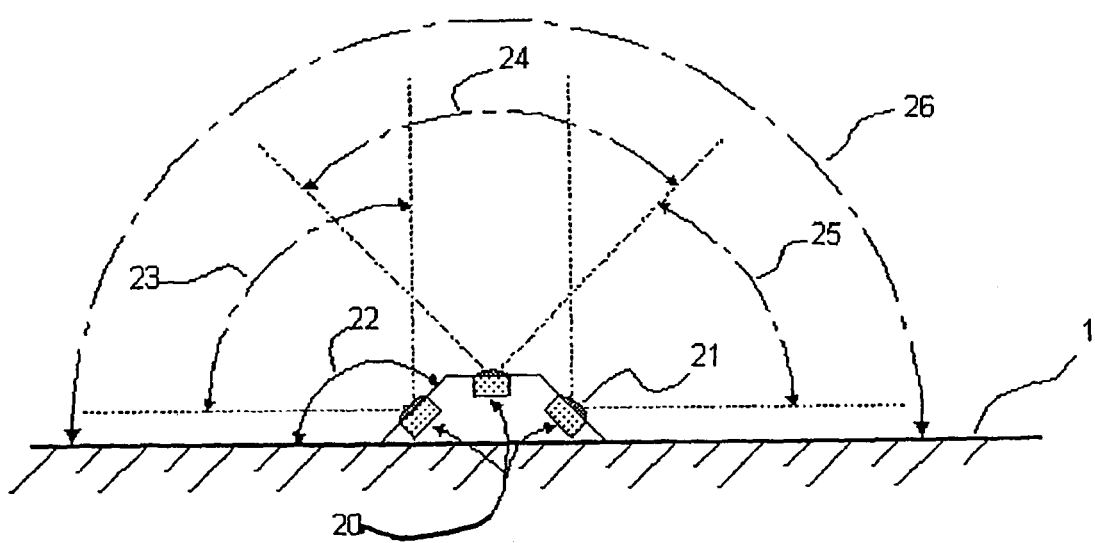
FIG. 3 depicts a first embodiment of the system according to the invention.
Figure 5:
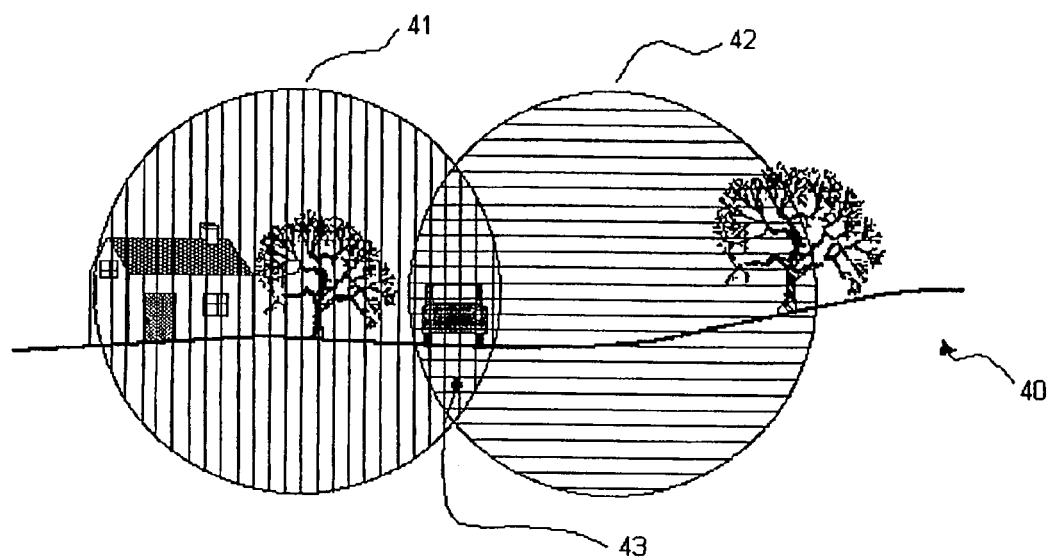
FIG. 5 depicts the graphic scene of FIG. 4 partitioned between two separate fields of view.
Figure 6:
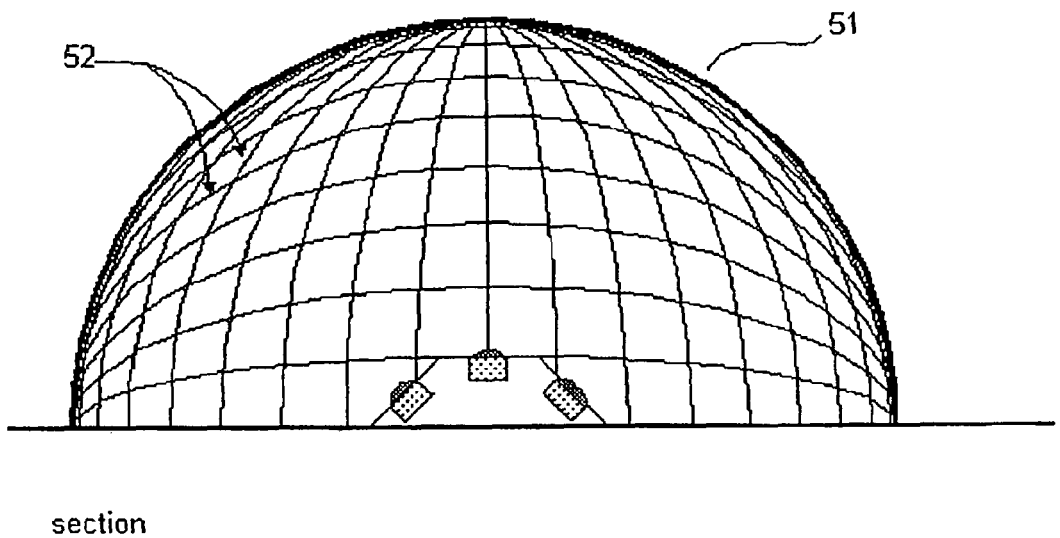
FIGS. 6, 7 and 8 depicts a system according to the invention with a grid disposed within the field of view.
Figure 10A:
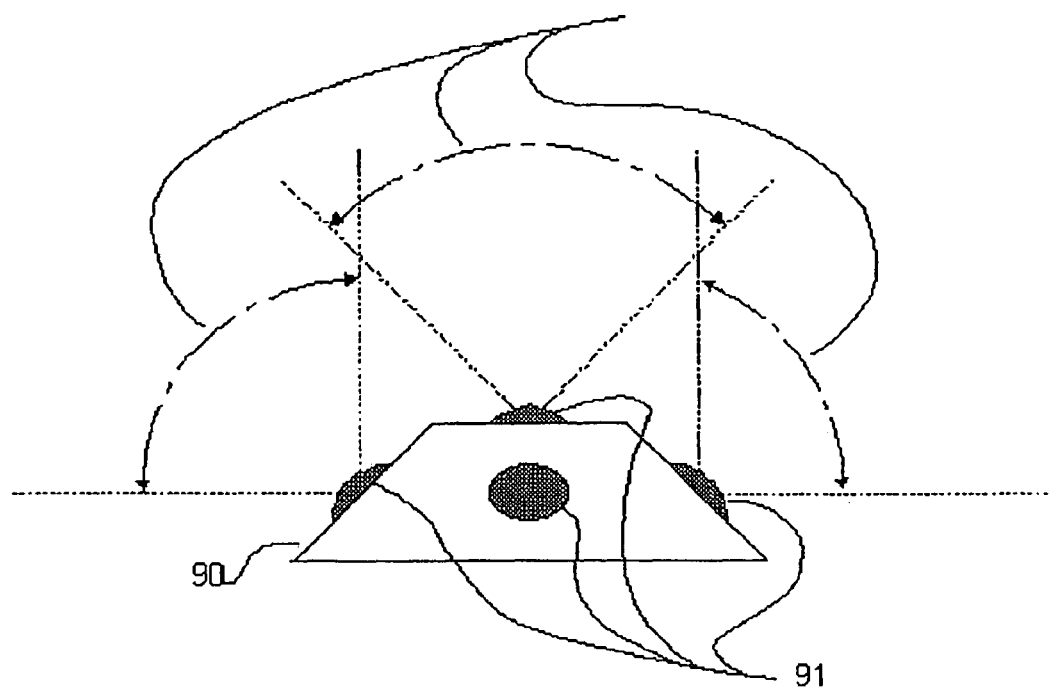
FIGS. 10A and 10B depict a system according to the invention.
Figure 10B:
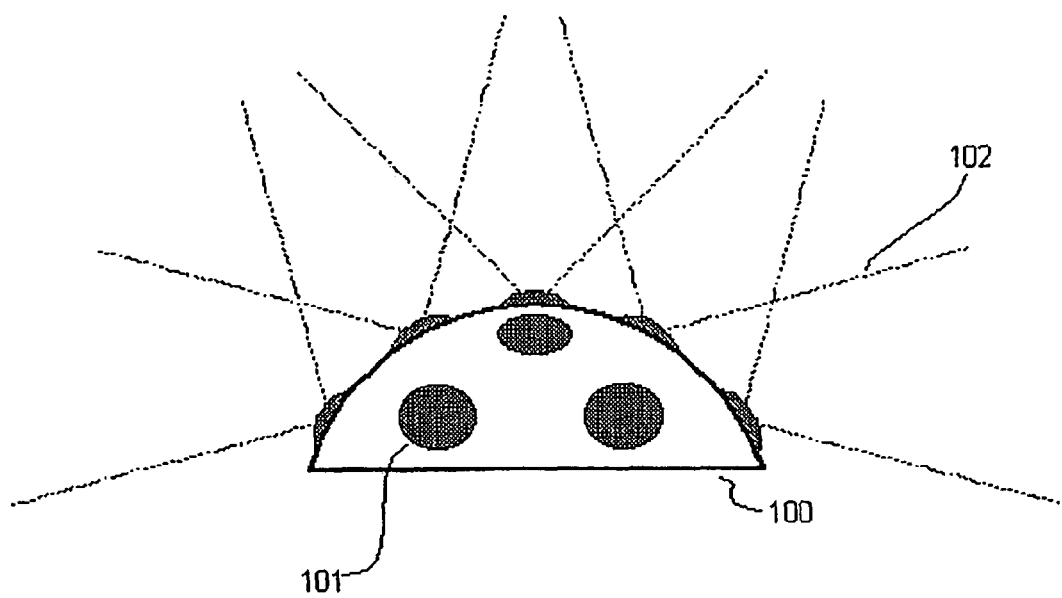

FIG. 3 depicts an embodiment according to the invention where a plurality of sensors 21 are statically mounted to a body, where each sensor 21 is directed to a portion of the panoramic scene, as depicted in FIG. 5, and in FIG. 10B. In the depicted embodiment, multiple sensors 21 are mounted on a block so that their individual fields of view 23, 24, 25 overlap and in sum cover a whole hemisphere 26. The block is placed inside a hemispheric dome 51 as depicted in FIG. 6, and in one embodiment a laser beam is played over the inner surface of the dome in such a way that it traces out a grid-like pattern 52. The laser's driver is coordinated with a computer so that when, for example, the laser's spot is directly overhead the sensor block, the computer fills in a lookup table with the information of which pixel of which sensor "sees" the laser spot at that point.

As the laser beam moves around the inside of the dome 51, the lookup table is built up so that for every spot on the dome, the table says which pixels of which sensor "see" it. This lookup table may then be burned into a memory device that resides with the sensor block. In this way, the sensors can be-mounted in a low-precision/low-cost manner, and then given a high precision calibration. The calibration method, being software rather than hardware, is low cost.

Note that the laser dot can be made to cover essentially every spot within the dome (given the diameter of the laser dot and enough time), which means that the lookup table may be filled in by direct correlation of every pixel in the dome's interior to one or more pixels in one or more sensors. Alternatively, the laser can be made to trace out a more open grid or other pattern and the correlation's between these grid points can be interpolated by the computer.

When the user wants to view a section of the hemispheric view of the sensors that is (for example) 40° wide by 20° high at a certain azimuth and elevation, this request is input into the computer. The computer calculates where the upper left corner of the rectangle of this view lies in the look-up table. The display driver then looks up which pixel from which sensor to use as it paints the display screen from left to right and top to bottom.

Figure 9:
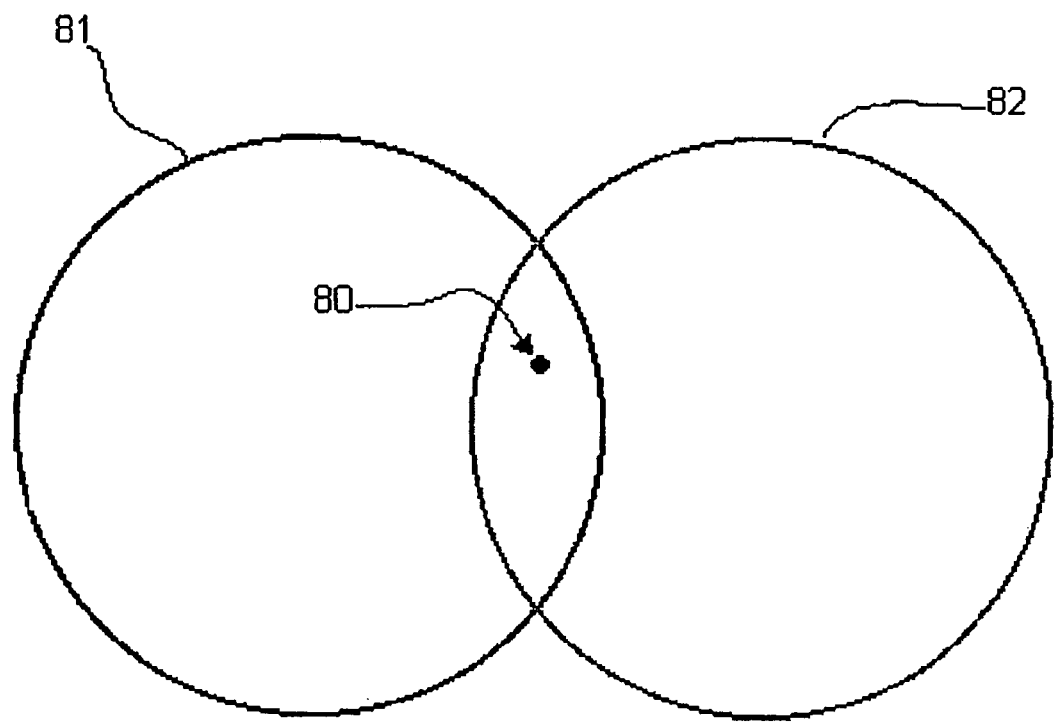
FIG. 9 depicts a location within an image wherein the location is at the intersection of two separate fields of view.
Figure 11:
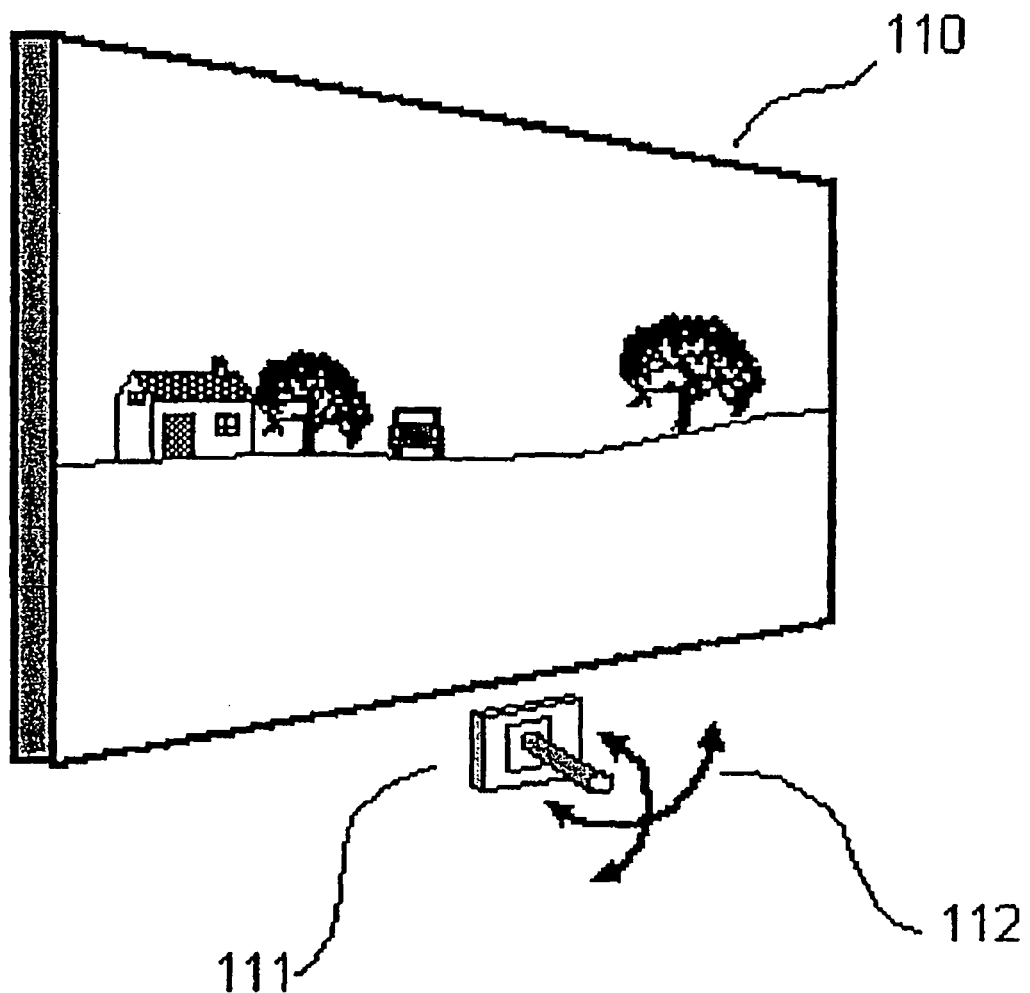
FIG. 11 depicts a user display employing a system according to the invention for depicting a graphic scene, such as the scene depicted in FIG. 4.

As the user moves his field of view around, the display driver shifts the starting point within the lookup table from which to gather the information to paint the display. This is illustrated FIG. 11 that depicts a user moving through a graphic scene, such as the scene depicted in FIG. 4;

If there are multiple pixels at a certain calibration point (as will happen where the sensors' fields overlap as shown in FIG. 9), then the computer can use a number of different strategies to chose how to write the display. It can:
  randomly chose one pixel;
  average the values of all the pixels available at that point;
  throw out the darkest pixel and display the lighter (if pixels failure mode is off);
  use the pixel that has shown the most recent change (another way of detecting broken pixels or pixels whose view has been obscured by dirt on the lens or other kind of damage, i.e., this constitutes a self-healing mechanism); or
  apply any other suitable technique for selecting or combining the multiple choices.

If the user wants to "zoom in" on the image, the driver can select a narrower and shorter section of the lookup table's grid to display. If the number of pixels in this lookup table section are fewer than the number of pixels that are needed to paint the full width of the screen then the pixels in between can be calculated, as is common in the "digital zoom" of existing cameras or in programs such as Photoshop.

If the user wants to "zoom out" to get a wider field of view, so that the pixels in the lookup table exceed the pixels in the width and height of the screen, then the computer can average the excess pixels to get an average value to be painted at each pixel displayed on the screen.

Sensors of multiple frequency sensitivity (for example visible light sensors and thermal sensors) can be mixed in a layered lookup table. This would allow the user to select between different kinds of vision, or to merge the different pixel values to get a sensor fusion effect (this can have certain advantages in the military environment for target recognition and identification). The sensors can be of any suitable type and may include CCD image sensors. The sensors may generate a file in any format, such as the raw data, GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, possibly PostScript, and PM formats on workstations and terminals running the X11 Window System or any image file suitable for import into the data processing system. Additionally, the system may be employed for generating video images, including digital video images in the .AVI, .MPG formats.

Optionally, the system may comprise a micro-controller embedded into the system. The micro-controller may comprise any of the commercially available micro-controllers including the 8051 and 6811 class controllers. The micro-controllers can execute programs for implementing the image processing functions and the calibration functions, as well as for controlling the individual system, such as image capture operations. Optionally, the micro-controllers can include signal processing functionality for performing the image processing, including image filtering, enhancement and for combining multiple fields of view. These systems can include any of the digital signal processors (DSP) capable of implementing the image processing functions described herein, such as the DSP based on the TMS320 core sold and manufactured by the Texas Instruments Company of Austin, Tex.

Optionally, If it is desired or necessary to reduce the bandwidth between the system's sensor head and display, then the digital storage of the lookup table and an associated processor can be placed in the sensor head, making an "intelligent sensor head.". In this way, when the user calls for a certain frame of view within the lookup table's pixels, and the sensor head has to only transmit that specific information, rather than the larger data set that comprises the sensor head's whole field of view. This configuration might be desirable, for example, when using a wireless connection between the sensor head and the display. Besides a wireless connection, the sensor head might alternatively communicate with the display unit by means of a wire, a fiber optic link or via light (for example by means of an Infrared emitter/detector pair).

Also, the system can be configured such that the "intelligent sensor head" will only transmit an image to the system's display if there is certain changes in the pixels in a section of the sensor head's field of view (i.e., movement). In one method the processor that manages lookup table can detect motion, for example, by being programmed to note if a certain number of pixels within the field of view are changing more than a certain set amount while other pixels around these changing pixels are not changing. The "intelligent sensor head could then select a frame of view such that these changing pixels (the moving object) are centered within the frame and then send that image to the display. Alternatively, the sensor head could select a frame from among a predetermined set of view frames that best contains the changing pixels and send that frame to the display (this may help a user familiar with the set of possible frames more easily identify where within the larger field of view the motion is occurring).

In another example in accordance with the invention, a group of soldiers operating in a hostile urban environment, could place a sensor head on the corner of a building at an intersection they have just passed through. If the "intelligent sensor head" detects motion in its field of view, it can send the image from a frame within that field of view to the soldiers with the object which is moving centered within it. For example, they would then know if an enemy tank comes down the road behind them. Such a sensor would make it unnecessary to leave solders behind to watch the intersection and the sensor head would be harder for the enemy than detecting a soldier.

In another example in accordance with the invention, a group of soldiers temporarily in a fixed location could set a group of intelligent senor heads around their position to help guard their perimeter. If one of the sensor heads detected motion in its field of view, it would send an image from a frame within that field of view to the soldiers with the object which is moving centered within it. The display could alert the soldiers that a new image was coming in. If there were objects moving in multiple locations, the sensor heads and could display their images sequentially in the display, or do things such as tile the images.

In another example in accordance with the invention, the sensor head can be configured such that it can be glued to a wall of a building. Alternatively, the sensor head can be configured so that it can be thrown to the location where the user wishes it to transmit from. So that correct up/down orientation of the image is achieved at the display unit in a way that does not require the user to be precise in the mounting or placement of the sensor head, the sensor head can include a gravity direction sensor that the processor can use to in determining the correct image orientation to send to the display.

Figure 7:
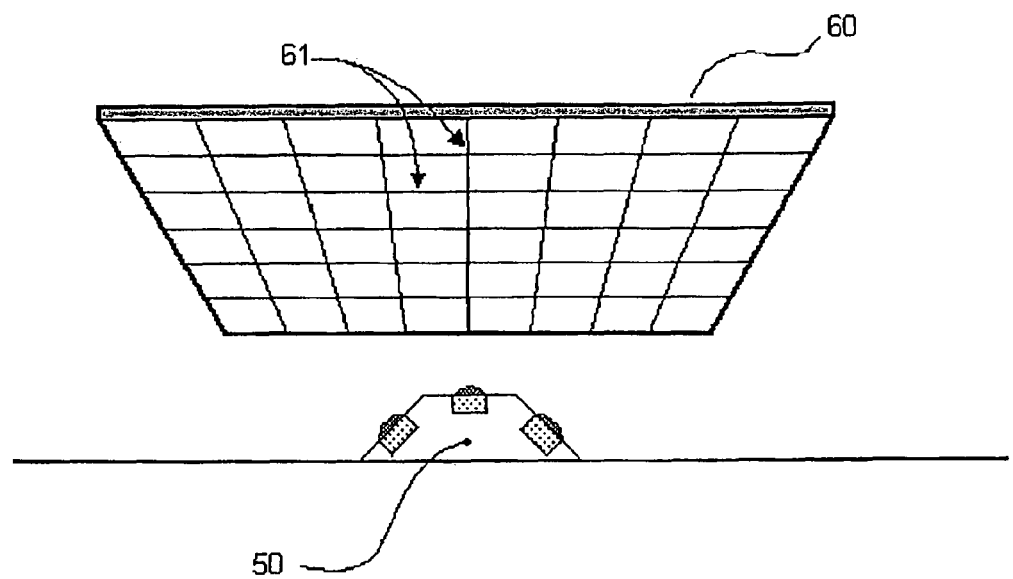
Figure 8:
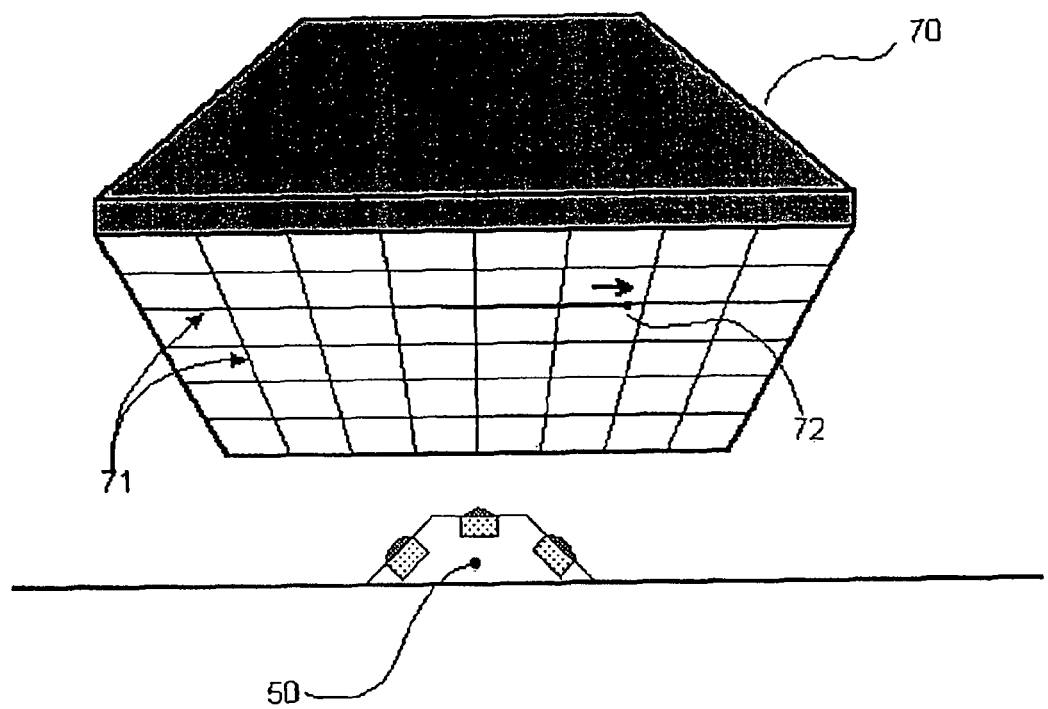

The systems and methods described herein are merely presented as examples of the invention and numerous modifications and additions may be made. For example, the sensors do not need to be on one block, but might be placed around the surface of a vehicle or down the sides of a tunnel or pipe. The more the sensors' fields of view overlap, the more redundancy is built into the system. The calibrating grid could also be a fixed pattern of lights, an LCD or a CRT screen, as depicted in FIG. 7 and FIG. 8. The sensor block could cover more or less than a hemisphere of the environment.

This method allows for non-precision, and thus lower-cost manufacture of the sensor head and a post-manufacturing software calibration of the whole sensor head instead of a precise mechanical calibration for each sensor. If there is to be some relative accuracy in the mounting of each sensor head, then a generic calibration could be burned into the lookup table for the units. This might have applications in situations such as mounting sensors around vehicles so that each individual vehicle does not have to be transported to a calibration facility. It will be understood that compared to a wide-angle lens, the light rays used by multiple sensors that have narrower fields of view are more parallel to the optical axis than light at the edges of a wide-angle len's field of view. Normal rays are easier to focus and thus can get higher resolution with lower cost. The techniques described herein can be used for pipe (metal or digestive) inspection. If the whole body of the probe "sees," then you don't need to build in a panning/tilting mechanism. In other embodiments, the device could have sensors mounted around the surface of a large, light ball. With an included gravity (up, down) sensor to orient the device, you could make a traveler that could be bounced across a terrain in the wind and send back video of a 360° view. In one practice of manufacturing the systems described herein, the sensors are put in cast Lexan (pressure resistant) and positioned on a deep submersible explorer. For this device, you do not need a heavy, expensive, large and water tight dome for the camera. These inexpensive devices may be used in many applications, such as security and military applications for example, you can put a unit on top of a sub's sail. This may have prevented the recent collision off of Pearl Harbor when a Japanese boat was sunk during a submarine crash surfacing test.

The systems described herein include manufacturing systems that comprise a hemi-spherical dome sized to accommodate a device having a plurality of sensors mounted thereon. As shown in FIG. 10A, a laser, or other light source, may be included that traces a point of light across the interior of the dome. Alternatively, other methods for providing a calibrating grid may be provided including employing a fixed pattern of lights, as well as an LCD or a CRT screen. In any case, a computer coupled to the multiple sensors and to the laser driver determines the location of the point of light and selects a pixel or group of pixels for a sensor, to associate with that location.

Figure 12:
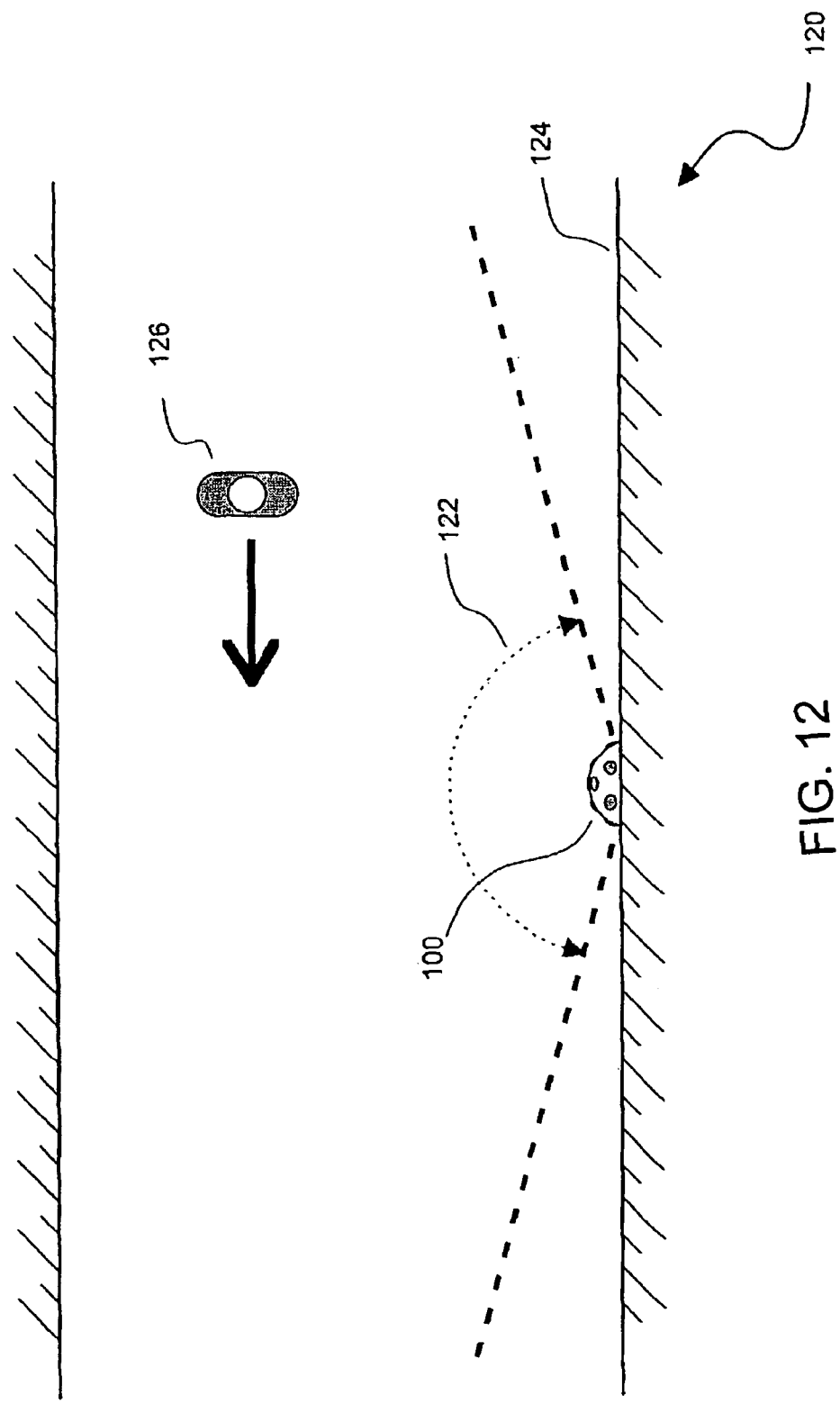
FIG. 12 depicts a system according to the invention mounted on a corridor wall detecting a moving object.

As can be seen in FIG. 12 in a top view, a sensor head 100 is mounted on the wall of a corridor 120 such that its total field of view 122 covers most of the corridor, and a person walking down the corridor 126 is within the field of view.

Figure 13A:
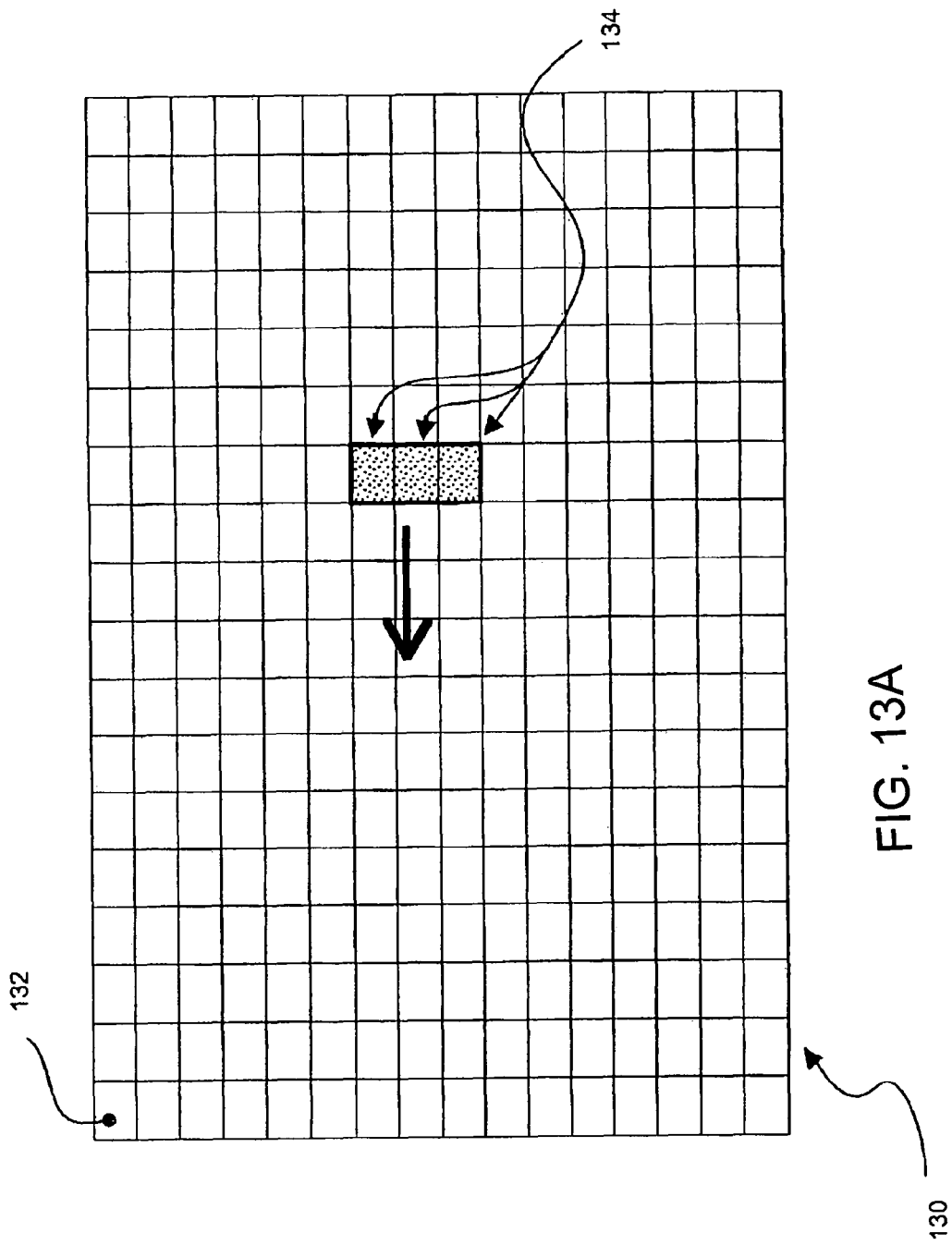
FIG. 13A depicts graphically a range of pixels in a lookup table of a system according to the invention with the image of a moving object located therein.
Figure 13B:
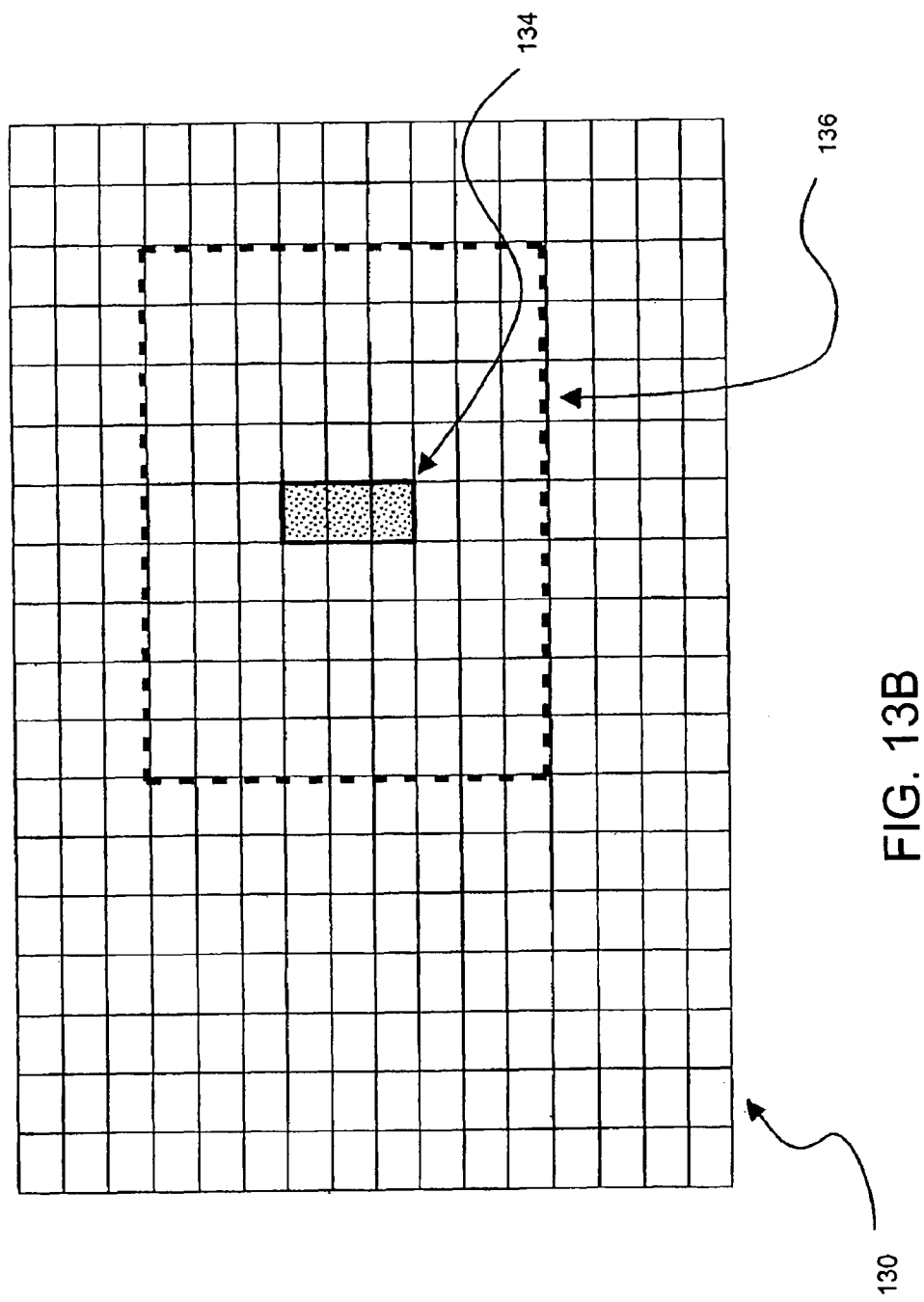
FIG. 13B depicts graphically a range of pixels in a lookup table of a system according to the invention with the image of a moving object located within a view selected therein.
Figure 13C:
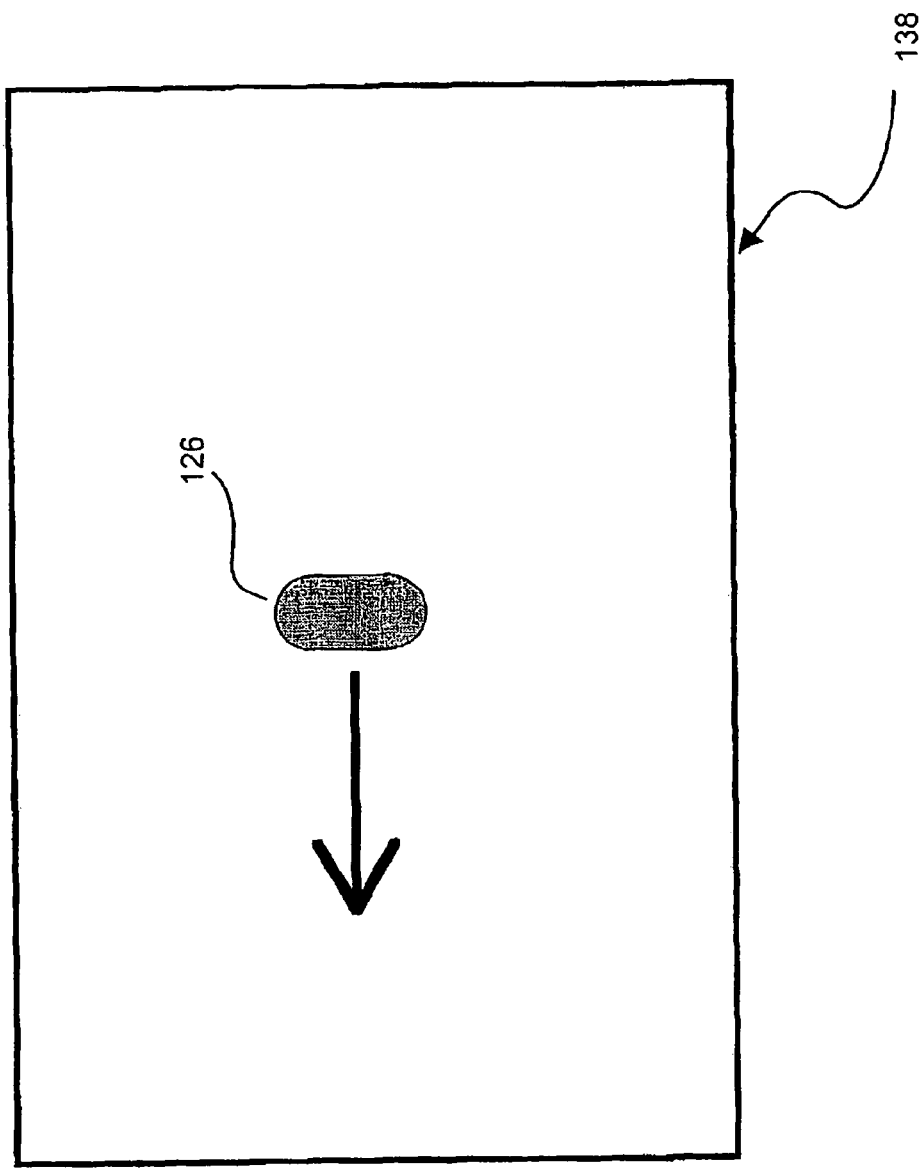
FIG. 13C depicts a the image on a display of a system according to the invention.

As represented diagrammatically in FIG. 13A, a lookup table 130 is made up of the pixels 132 that comprise the field of view of a device in accordance with the invention. Within these pixels at a certain point in time, a smaller subset of pixels 134 represent an object that is moving within the sensor head's field of view. As shown in FIG. 13B, the sensor head's processor can be programmed to select a frame of view 136 within the sensor head's total field of view 130 which is centered on the pixels 134 that depict a moving object. As shown in FIG. 13C, when this the pixels included in this frame of view are transmitted to the device's display, it will result in an image 138 within which the image of the moving object detected 126 will be centered.

Figure 14:
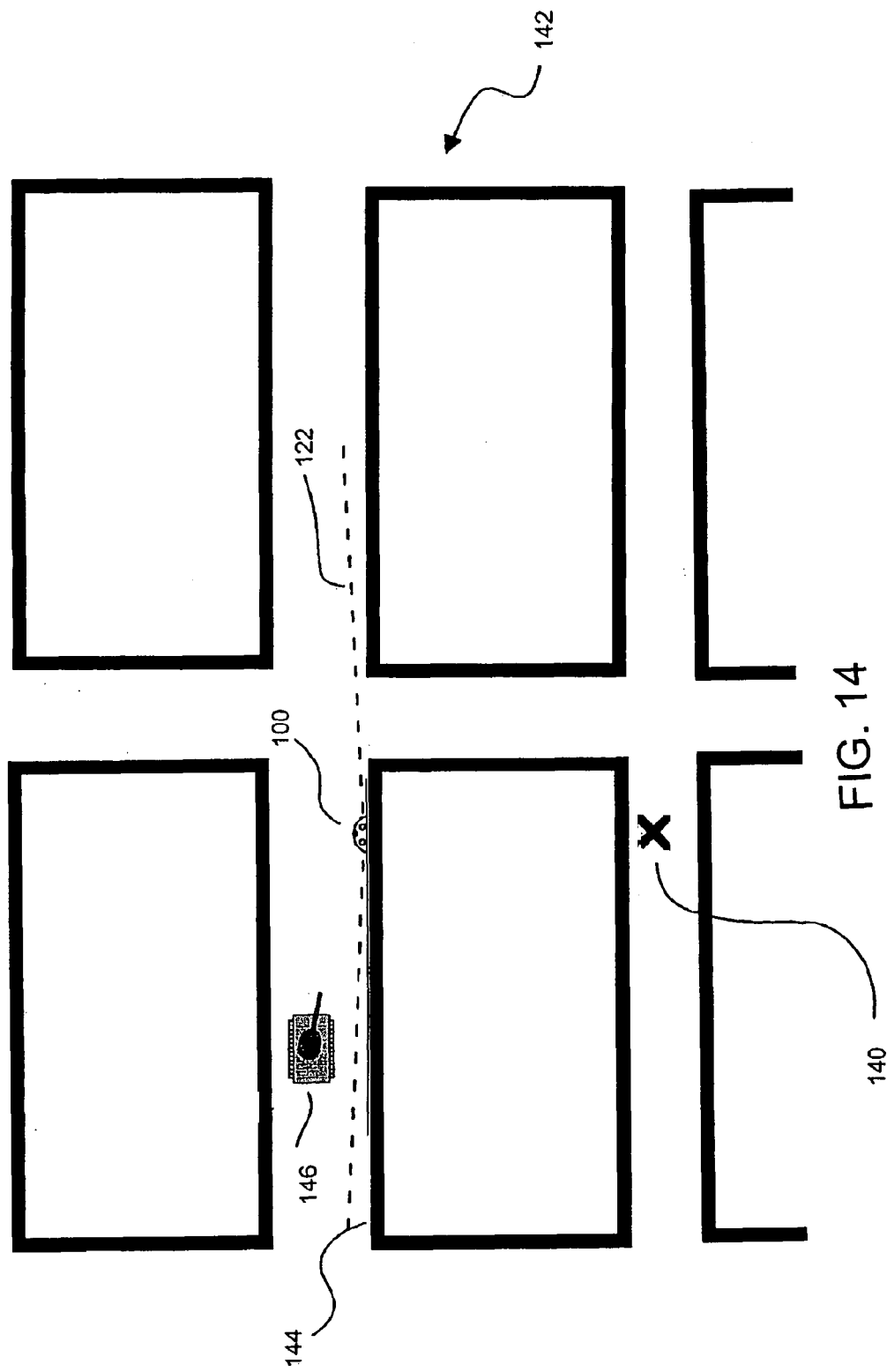
FIG. 14 depicts graphically an urban war zone where a group of soldiers have deployed a system according to the invention.

As shown in FIG. 14, if a group of soldiers 140 operating in an urban environment 142 leaves an "intelligent sensor heed" 100 behind them on the wall 144 of a building, mounted such that the head's field of view 122 encompasses the street, then the sensor head can show then via a wireless connection to a display they retain when an enemy, such as a tank 146, comes up behind them and constitutes a possible threat.

Figure 15:
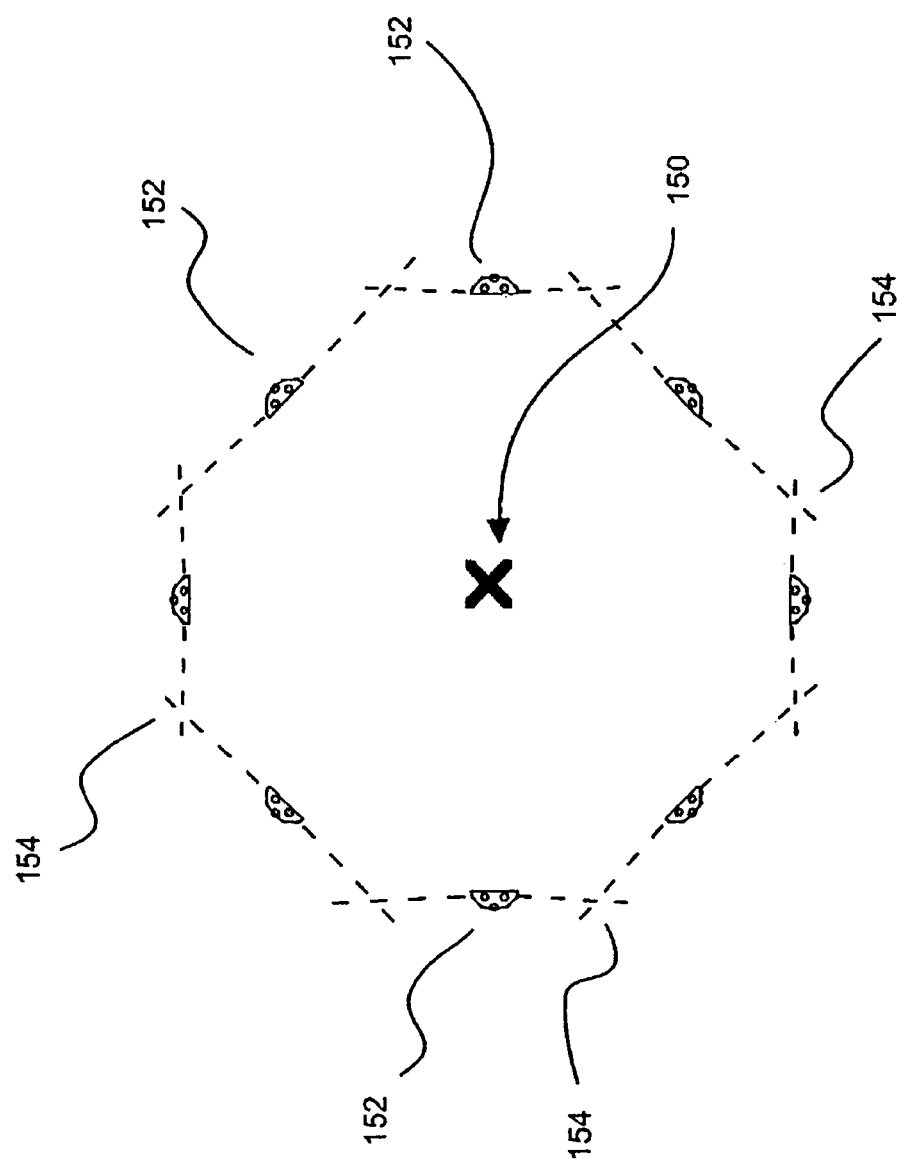
FIG. 15 depicts a group of systems according to the invention deployed around a fixed location.

As shown in FIG. 15, a group of soldiers occupying a position 150 and deploy a group of intelligent sensor heads 152 around their position such that the fields of view 154 overlap. In this way the soldiers can more easily maintain surveillance of their position's perimeter to detect threats and possible attacks.

The systems further include sensor devices including a plurality of sensors disposed on a surface of a body and a mechanism for selecting between the sensors to determine which sensor should provide information about data coming from or passing through a particular location. The body may have any shape or size and the shape and size chosen will depend upon the application. Moreover, the body may comprise the body of a device, such as a vehicle, including a car, tank, airplane, submarine or other vehicle. Additionally, the surface may comprise the surface of a collapsible body to thereby provide a periscope the employs solid state sensors to capture images. In these embodiments, the systems may include a calibration system that provides multiple calibration settings for the sensors. Each calibration setting may correspond to a different shape that the surface may attain. Thus the calibration setting for a periscope that is in a collapse position may be different from the calibration setting employed when the periscope is in an extended position and the surface as become elongated so that sensors disposed on the periscope surface are spaced farther apart.

The systems may include sensors selected from the group of image sensors, CCD sensors, infra-red sensors, thermal imaging sensors, acoustic sensors, and magnetic sensors.

As discussed above, these sensor can be realized hardware devices and systems that include software components operating on an embedded processor or on a conventional data processing system such as a Unix workstation. In that embodiment, the software mechanisms can be implemented as a C language computer program, or a computer program written in any high level language including C++, Fortran, Java or Basic. Additionally, in an embodiment where microcontrollers or DSPs are employed, the software systems may be realized as a computer program written in microcode or written in a high level language and compiled down to microcode that can be executed on the platform employed. The development of such image processing systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

I claim:

1. A method for calibrating a panoramic image sensor, the method comprising:
   presenting a pattern to a plurality of imaging sensors, each of the imaging sensors having a plurality of pixels and being disposed on a sensor body, wherein the imaging sensors have partially overlapping fields of view;
   capturing an image of the pattern appearing in the fields of view of the imaging sensors;
   processing the captured images to identify overlapping portions of the pattern that correspond to overlapping regions within the overlapping fields of view of the imaging sensors; and
   processing the overlapping portions of the pattern to generate a lookup table comprising information that indicates at a certain time which pixels of which sensors sense a common portion of the pattern.

2. The method of claim 1 wherein the pattern is a hemispherical pattern.

3. The method of claim 1 wherein the pattern is a grid pattern.

4. The method of claim 1 wherein presenting the pattern comprises tracing the pattern across a surface with a light source.

5. The method of claim 4 wherein the lookup table comprises information indicating which pixels of which imaging sensors respond to the light source at a defined point in the pattern.

* * * * *